United States Patent
Soohoo (10) Patent No.: US 9,505,479 B2
(45) Date of Patent: Nov. 29, 2016

(54) POSITION-LOCKING FOR A WATERCRAFT USING AN AUXILIARY WATER VESSEL

(71) Applicant: The Boeing Company, Chicago, IL (US)

(72) Inventor: Kie L Soohoo, Tustin, CA (US)

(73) Assignee: The Boeing Company, Chicago, IL (US)

( * ) Notice: Subject to any disclaimer, the term of this patent is extended or adjusted under 35 U.S.C. 154(b) by 199 days.

(21) Appl. No.: 14/530,466

(22) Filed: Oct. 31, 2014

(65) Prior Publication Data
US 2016/0214696 A1    Jul. 28, 2016

(51) Int. Cl.
| | |
|---|---|
| *B63H 25/04* | (2006.01) |
| *G05D 1/00* | (2006.01) |
| *B63G 8/42* | (2006.01) |
| *B63G 8/00* | (2006.01) |
| *B63H 25/42* | (2006.01) |

(52) U.S. Cl.
CPC ............... *B63H 25/04* (2013.01); *B63G 8/001* (2013.01); *B63G 8/42* (2013.01); *B63H 25/42* (2013.01); *G05D 1/00* (2013.01); *B63G 2008/004* (2013.01)

(58) Field of Classification Search
CPC B63H 25/04; B63H 25/42; B63G 2008/004; G05D 1/00; G05D 1/0208; G05D 1/0206; G05D 1/048; G05D 1/0692; G05D 1/0875
See application file for complete search history.

(56) References Cited

U.S. PATENT DOCUMENTS

| | | | | |
|---|---|---|---|---|
| 3,105,453 | A * | 10/1963 | Hayes | B63G 8/001 114/144 B |
| 3,999,499 | A * | 12/1976 | Kitabayashi | B63G 8/42 114/244 |
| 5,081,582 | A | 1/1992 | Araki et al. | |
| 6,771,563 | B1 * | 8/2004 | Bernard | B63C 11/42 114/338 |
| 2009/0076671 | A1 | 3/2009 | Mizutani | |
| 2009/0095208 | A1 | 4/2009 | Cardoza et al. | |
| 2009/0311925 | A1 * | 12/2009 | Hine | B63H 1/36 440/13 |
| 2012/0253566 | A1 * | 10/2012 | Ballou | G08G 3/02 701/21 |
| 2013/0188449 | A1 | 7/2013 | Brizard | |

FOREIGN PATENT DOCUMENTS

GB    1021264 A *   3/1966   ............. B63G 8/001

* cited by examiner

*Primary Examiner* — Abby Lin
(74) *Attorney, Agent, or Firm* — Duft Bornsen & Fettig LLP (57) ABSTRACT

Apparatus and methods for holding the position of a watercraft stationary. An exemplary method includes measuring a velocity of an auxiliary water vessel relative to the watercraft with a first sensor, where the auxiliary water vessel is deployed at a depth between the watercraft and a ground surface of the body of water. The method further includes measuring a velocity of current in the body of water relative to the watercraft with a second sensor. The method further includes processing the velocity measurement of the auxiliary water vessel and the velocity measurement of the current to determine a net movement of the watercraft, and controlling a propulsion system to compensate for the net movement of the watercraft to hold the watercraft in a stationary position.

20 Claims, 6 Drawing Sheets

POSITION-LOCKING FOR A WATERCRAFT USING AN AUXILIARY WATER VESSEL

GOVERNMENT LICENSE RIGHTS

This invention was made with United States Government (USG) support. The government has certain rights in the invention.

FIELD

This disclosure relates to the field of watercraft, such as ships, submarines, etc. More particularly, the disclosure relates to holding the position of a watercraft stationary in or on a body of water.

BACKGROUND

There are situations where the crew of a ship, submarine, or another type of watercraft, wants to hold the position of the watercraft stationary without use of an anchor. Some watercrafts are equipped with a Global Positioning System (GPS) that can track their position. A navigation system within the watercraft can then hold the position of the watercraft stationary based on data from the GPS. However, there are instances when the GPS is not able to receive signals from the satellites, such as in bad weather or when the watercraft is submerged below the surface of the water. When this occurs, other mechanisms are needed to hold the position of the watercraft stationary.

SUMMARY

Embodiments described herein use an auxiliary water vessel as a reference point to hold a stationary position. When the auxiliary water vessel submerges somewhere below the watercraft, the embodiments described herein use sensors to measure a relative velocity of the auxiliary water vessel as a reference to estimate a velocity of the watercraft. To compensate for possible drift of the auxiliary water vessel, the sensors also measure current in the water. A navigation system on the watercraft may then process the data from the sensors to determine a net movement of the watercraft, and control a propulsion system to hold the position of the watercraft stationary. Therefore, even though GPS signals may not be available to the watercraft, it may hold its position by using the auxiliary water vessel as a reference point.

One embodiment comprises a watercraft configured to operate in a body of water. The watercraft includes a first sensor configured to measure a velocity of an auxiliary water vessel relative to the watercraft that is deployed at a depth between the watercraft and a ground surface of the body of water, and a second sensor configured to measure a velocity of current in the body of water relative to the watercraft. The watercraft further includes a navigation controller configured to process the velocity measurement of the auxiliary water vessel and the velocity measurement of the current to determine a net movement of the watercraft. The navigation controller is further configured to compensate for the net movement of the watercraft to hold the watercraft in a stationary position.

In another embodiment, the watercraft further includes a deployment controller configured to deploy the auxiliary water vessel from the watercraft into the body of water to submerge below the watercraft.

Another embodiment comprises a method for holding a watercraft in a stationary position. The method includes measuring a velocity of an auxiliary water vessel relative to the watercraft with a first sensor, where the auxiliary water vessel deployed at a depth between the watercraft and a ground surface of the body of water. The method further includes measuring a velocity of current in the body of water relative to the watercraft with a second sensor. The method further includes processing the velocity measurement of the auxiliary water vessel and the velocity measurement of the current to determine a net movement of the watercraft, and controlling a propulsion system to compensate for the net movement of the watercraft to hold the watercraft in a stationary position.

Another embodiment comprises a positioning system for holding a watercraft stationary in a body of water. The positioning system is configured to measure a velocity of an auxiliary water vessel relative to the watercraft that is deployed at a depth between the watercraft and a ground surface of the body of water, and to measure a velocity of current in the body of water. The positioning system is configured to add a velocity vector representing the velocity measurement of the current with a velocity vector representing the velocity measurement of the auxiliary water vessel to determine a net movement of the watercraft, to determine a thrust vector to hold the watercraft in the stationary position based on the net movement of the watercraft, and to control a propulsion system on the watercraft based on the thrust vector.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments of the present invention are now described, by way of example only, with reference to the accompanying drawings. The same reference number represents the same element or the same type of element on all drawings.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure, and are to be construed as being without limitation. As a result, this disclosure is not limited to the specific embodiments or examples described below, but by the claims and their equivalents.

Figure 1:
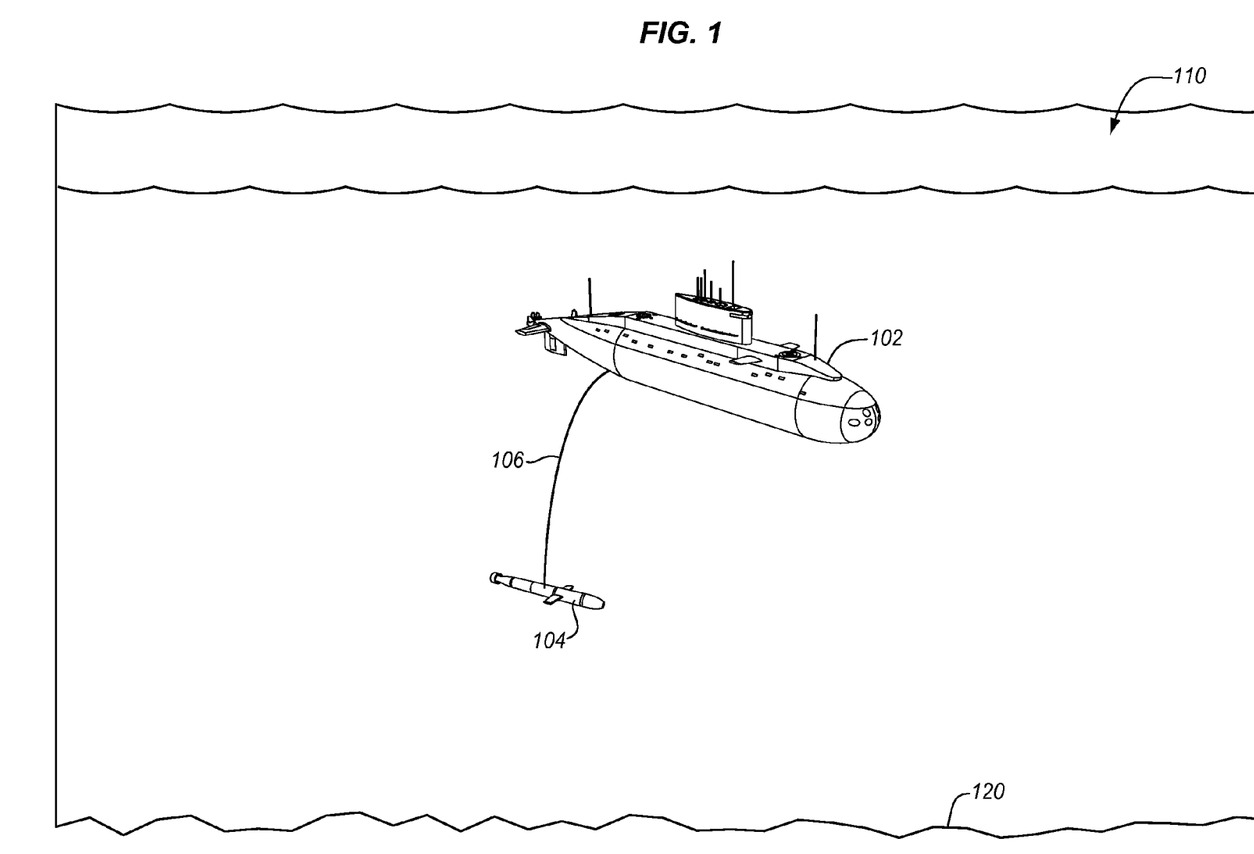
FIG. 1 illustrates a watercraft in a body of water in an exemplary embodiment.

FIG. 1 illustrates a watercraft 102 in a body of water 110 in an exemplary embodiment. Watercraft 100 comprises any water-based vehicle including a ship, a boat or other floating craft, a submarine or other submersible watercraft, etc. Although watercraft 100 is illustrated as being submerged in the body of water 110 in FIG. 1, it may be floating on a surface of the body of water 110 in other embodiments.

FIG. 1 also indicates an auxiliary water vessel 104 that is deployed at a depth between watercraft 102 and a ground surface 120 of body of water 120. In the embodiment shown in FIG. 1, auxiliary water vessel 104 is a submersible watercraft and may be installed as a deployable part of watercraft 102, and may be released as a tethered or untethered extension of watercraft 102. When not in use, auxiliary water vessel 104 may be retracted or recovered and stored on or within watercraft 102, or may be otherwise attached to watercraft 102. When in use, auxiliary water vessel 104 may be extended in the water a distance from watercraft 102, and may be attached to watercraft 102 by a tether 106 or some other mechanism. Auxiliary water vessel 104 may comprise an underwater vehicle that has an independent propulsion system, such as an Unmanned Underwater Vehicle (UUV), a Remotely Operated Underwater Vehicle (ROV), an Autonomous Underwater Vehicle (AUV), etc. Auxiliary water vessel 104 may alternatively comprise a towable object that does not have an independent propulsion system, such as a tow vehicle, a towfish, etc.

In another embodiment, auxiliary water vessel 104 is an independent or separate vessel from watercraft 102. Auxiliary water vessel 104 may be operating in a similar location as watercraft 102, and may be used as a reference for a position-lock.

Watercraft 102 is enhanced in the present embodiment with a dynamic positioning system to maintain a stationary position. Presently, ships, submarines, etc., may be able to maintain a stationary position using GPS or by locking onto a fixed point on the bottom surface of the body of water. However, when GPS signals are not available or the depth of the bottom surface exceeds the range of the sensors onboard, then present systems are unable to hold a stationary position. The dynamic positioning system described herein uses auxiliary water vessel 104 as a reference point to maintain a stationary position. The dynamic positioning system uses a velocity measurement of auxiliary water vessel 104 to estimate a velocity of watercraft 102. The dynamic positioning system also uses measurements of current(s) in body of water 110 to compensate for the relative motion of auxiliary water vessel 104 in the body of water 110. The dynamic positioning system can therefore use these measurements to determine the movement of watercraft 102, and to compensate for the movement to hold watercraft 102 in a stationary position.

Figure 2:
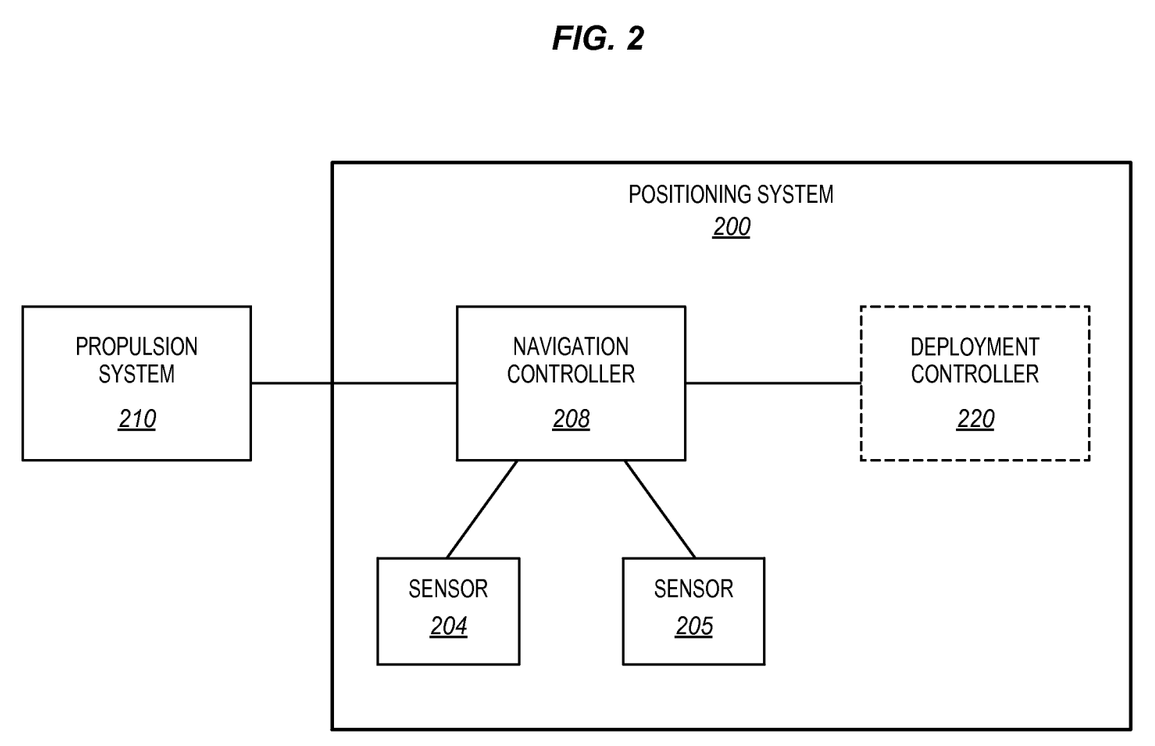
FIG. 2 is a schematic diagram of a positioning system in an exemplary embodiment.

FIG. 2 is a schematic diagram of a positioning system 200 in an exemplary embodiment. Positioning system 200 includes a plurality of sensors 204-205 and a navigation controller 208. Sensors 204-205 comprise any components, modules, or devices (including hardware) that measure a velocity of objects. Sensors 204-205 may comprise any type of sensor that uses the Doppler effect to measure velocity. In particular, the sensor and associated processor use Doppler effect artifacts or attributes, such as a measured phase difference, to determine relative motion. One type of sensor that uses the Doppler effect is an Acoustic Doppler Current Profiler (ADCP). Although two sensors 204-205 are shown in FIG. 1, there may be more sensors in other embodiments.

Navigation controller 208 comprises any component, module, or device (including hardware) that controls the movement or propulsion of watercraft 102. Navigation controller 208 is in communication with a propulsion system 210 for watercraft 102. Propulsion system 210 may comprise one or more thrusters for watercraft 102, one or more propellers for watercraft 102, or any other mechanism that is used to impart movement to watercraft 102 or drive watercraft 102 on a particular heading.

Positioning system 200 may optionally include a deployment controller 220 (indicated as optional with dotted lines). Deployment controller 220 comprises any component, module, or device (including hardware) that controls the deployment of auxiliary water vessel 104 into the water. When auxiliary water vessel 104 is part of watercraft 102, deployment controller 220 may be implemented to deploy auxiliary water vessel 104 into the body of water beneath watercraft 102.

Figure 3:
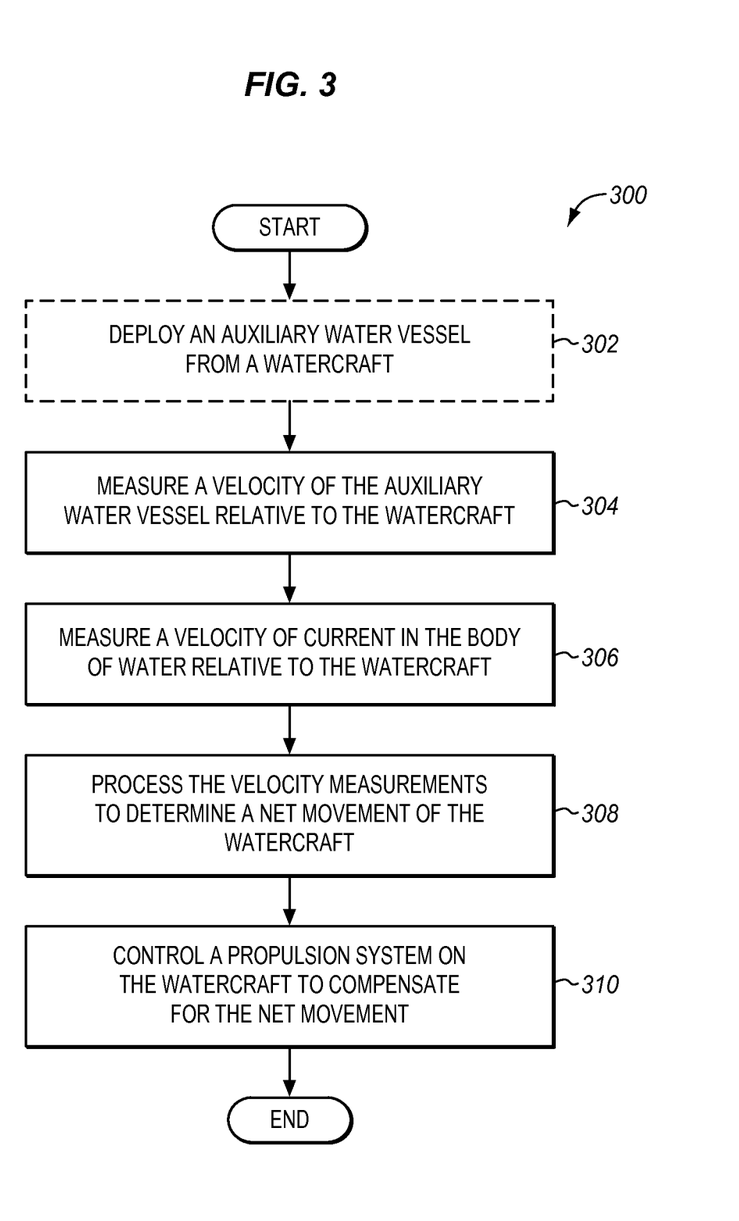
FIG. 3 is a flow chart illustrating a method for holding a watercraft in a stationary position in an exemplary embodiment.

FIG. 3 is a flow chart illustrating a method 300 for holding watercraft 102 in a stationary position in an exemplary embodiment. The steps of method 300 will be described with respect to positioning system 200 of FIG. 2, although one skilled in the art will understand that the methods described herein may be performed by other devices or systems not shown. The steps of the methods described herein are not all inclusive and may include other steps not shown. The steps for the flow charts shown herein may also be performed in an alternative order.

To begin, watercraft 102 has initiated a navigational operation to hold a stationary position. In nautical terms, watercraft 102 may be initiating a station-keeping operation to maintain a fixed position. For the station-keeping operation, a determination has been made within positioning system 200 (e.g., by navigation controller 208) that the bottom surface 120 of the body of water 110 is out of range of sensor 204 or sensor 205. Therefore, these sensors 204-205 are not able to lock onto a position on the bottom surface 120 for the station-keeping operation. Positioning system 200 uses auxiliary water vessel 104 as a reference point instead of the bottom surface for the station-keeping operation.

Step 302 of method 300 is optional where deployment controller 220 deploys auxiliary water vessel 104 from watercraft 102 to descend or submerge below watercraft 102. For example, deployment controller 220 may lower auxiliary water vessel 104 to a desired depth, or deployment controller 220 may operate a propulsion system in auxiliary water vessel 104 to navigate it to the desired depth. The desired depth may vary depending on desired implementations. In one embodiment, deployment controller 220 may deploy auxiliary water vessel 104 to a depth that corresponds with a minimum range for sensor 204. Typically, Doppler-effect sensors utilize filters that remove measurements from objects very close to the sensor. Also, the sound waves naturally attenuate within the water making readings unreliable after a certain distance. Thus, a minimum range and maximum range are defined for these sensors. When the desired depth for auxiliary water vessel 104 "corresponds with" the minimum range of sensor 204, this refers to the desired depth being close to the minimum range or at least closer to the minimum range than the maximum range of sensor 204. If an independent auxiliary water vessel 104 is in range of sensor 204 and available to use as a reference point, then step 302 is not needed.

FIG. 1 illustrates auxiliary water vessel 104 deployed at a desired depth. After auxiliary water vessel 104 is at the desired depth, auxiliary water vessel 104 hovers in the water and does not actively dive, surface, or drive in a particular direction. Therefore, auxiliary water vessel 104 maintains a quasi-stationary position, which is affected (only) by environmental effects such as water current.

Figure 4:
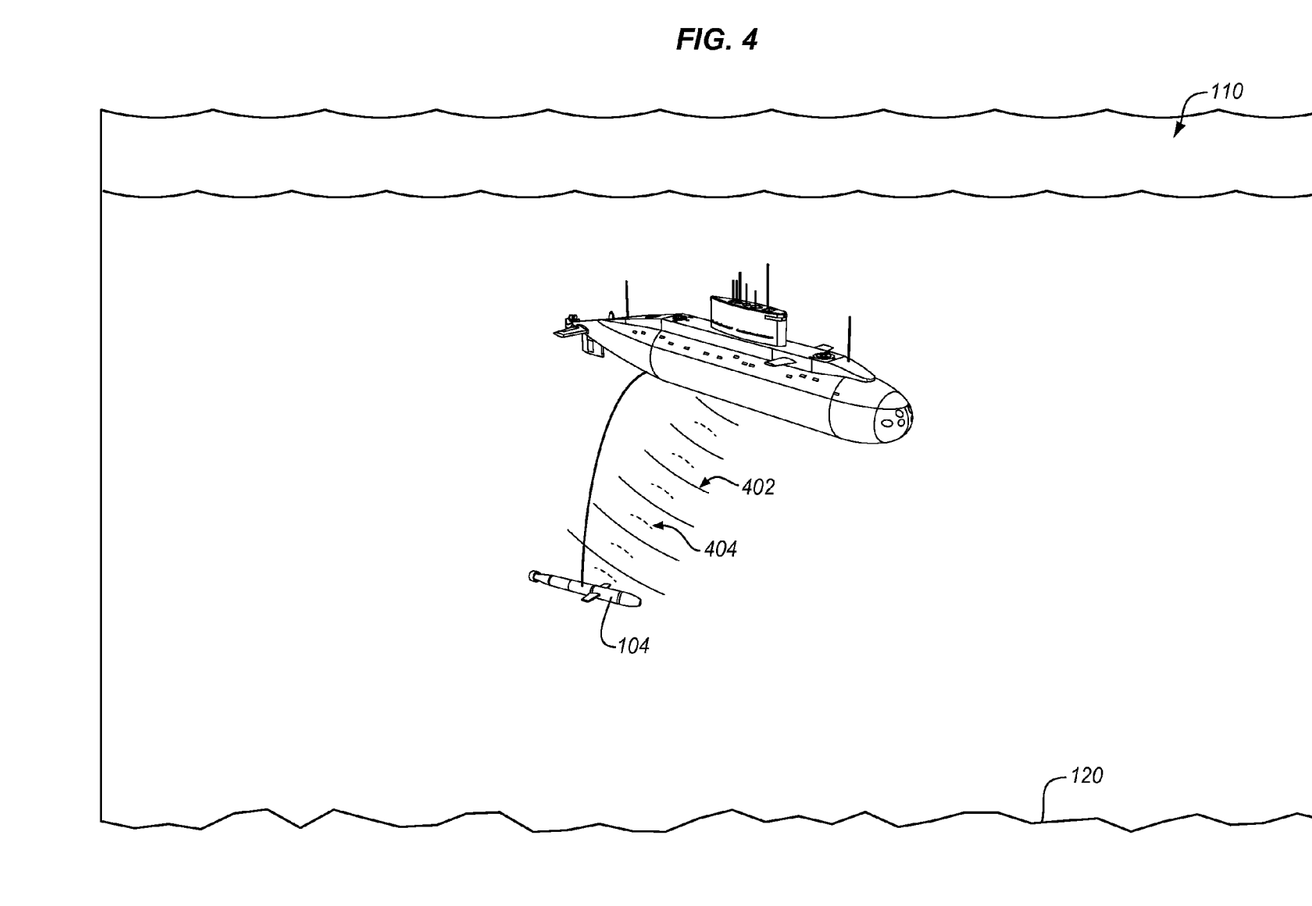
FIG. 4 illustrates a sensor in a watercraft measuring the velocity of an auxiliary water vessel in an exemplary embodiment.

Sensor 204 then measures a velocity of auxiliary water vessel 104 relative to watercraft 102 (step 304). FIG. 4 illustrates a sensor in watercraft 102 measuring the velocity of auxiliary water vessel 104 in an exemplary embodiment. To measure velocity, sensor 204 emits sound waves 402 in the direction of auxiliary water vessel 104 at a frequency. Sensor 204 then measures the Doppler effect of the sound waves 404 scattered or reflected back from auxiliary water vessel 104. For instance, sensor 204 analyzes how the frequency of the reflected sound waves is altered by the motion of auxiliary water vessel 104, which indicates the velocity of auxiliary water vessel 104 based on the Doppler effect. As noted above, sensor 204 may comprise an ADCP or another type of sensor that uses the Doppler effect.

As described in more detail below, the velocity measurement of auxiliary water vessel 104 can be used to estimate the velocity of watercraft 102. Auxiliary water vessel 104 may be treated as a fixed reference point for the measurement from sensor 204. In other words, auxiliary water vessel 104 is considered "quasi-stationary" for the purpose of the measurement from sensor 204 so that the velocity measurement from sensor 204 may be used as an estimate of the velocity of watercraft 102.

Figure 5:
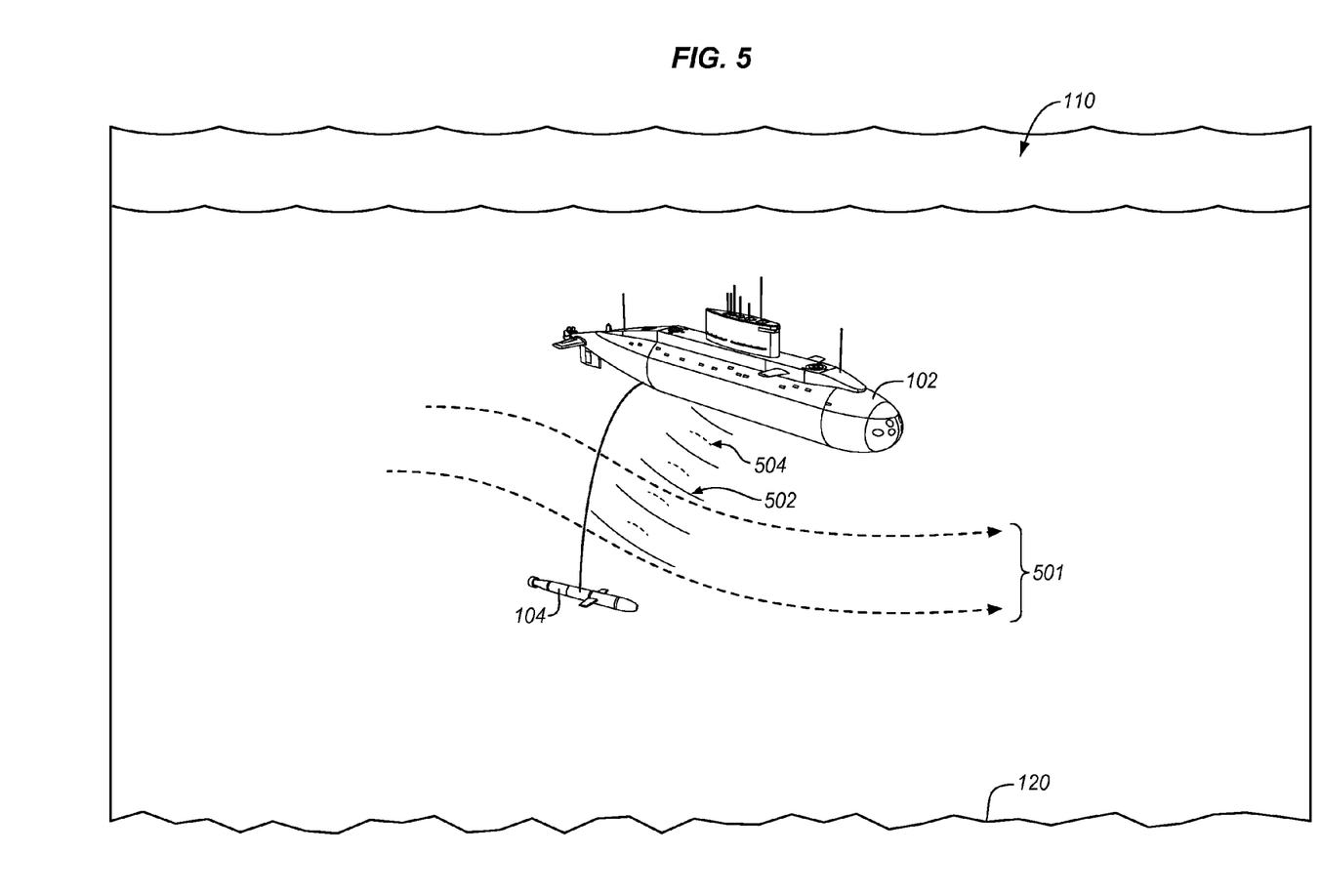
FIG. 5 illustrates a sensor in a watercraft measuring the velocity of a current in an exemplary embodiment.

In reality, auxiliary water vessel 104 is not stationary but may drift due to the environmental conditions in the water (e.g., current). Thus, sensor 205 in positioning system 200 measures a velocity of current in the body of water 110 relative to watercraft 102 (step 306). FIG. 5 illustrates a sensor in watercraft 102 measuring the velocity of current 501 in an exemplary embodiment. There may be current (or currents) 501 in the water column between watercraft 102 and auxiliary water vessel 104 and/or around auxiliary water vessel 104 that causes drift. To measure the velocity of the current 501, sensor 205 emits sound waves 502 over a depth range. Sensor 204 then measures the Doppler effect of the sound waves 504 scattered or reflected back from particles in the water column. Sensor 205 may then measure the frequency of the reflected sound waves 504 to determine the velocity of the current 501 at one or more depths. As noted above, sensor 205 may comprise an ADCP or another type of sensor that uses the Doppler effect. Positioning system 200 may include multiple sensors that measure velocity of current in the water. As illustrated in FIG. 5, a sensor is measuring current in a downward direction. But, positioning system 200 may include additional sensors that measure current upward from watercraft 102, off to the sides of watercraft 102, etc., to determine the velocity of current that may be affecting auxiliary water vessel 104.

Navigation controller 208 receives the velocity measurement from sensor 204 and the velocity measurement from sensor 205. Navigation controller 208 then processes the velocity measurements to determine a net movement of watercraft (step 308). Navigation controller 208 may then control propulsion system 210 to compensate for the net movement of watercraft 102 (step 310). For instance, if watercraft 102 is drifting in one direction, then navigation controller 208 may control propulsion system 210 to compensate for the drift and hold watercraft 102 in a stationary position.

As an example of the processing performed by navigation controller 208, auxiliary water vessel 104 is considered a quasi-stationary point or reference point for the measurement from sensor 204. For example, auxiliary water vessel 104 may be considered like a fixed ground point for the measurement from sensor 204. Because auxiliary water vessel 104 is considered a quasi-stationary point, the velocity measurement of auxiliary water vessel 104 may be used to determine the estimated velocity of watercraft 102. For instance, when an object is moving in relation to a Doppler-effect sensor that is stationary, the Doppler-effect sensor determines a velocity of the object that is moving. Likewise, when a Doppler-effect sensor is moving in relation to a stationary object, the Doppler-effect sensor determines a velocity, which in this case would be the velocity of the moving sensor. In this embodiment, the auxiliary water vessel 104 is considered a quasi-stationary or fixed point and sensor 204 on watercraft 102 is moving (e.g., due to watercraft 102 drifting in/on the water). Thus, the velocity measurement of auxiliary water vessel 104 indicates the velocity of watercraft 102 if auxiliary water vessel 104 is considered as a fixed reference point.

Figure 6:
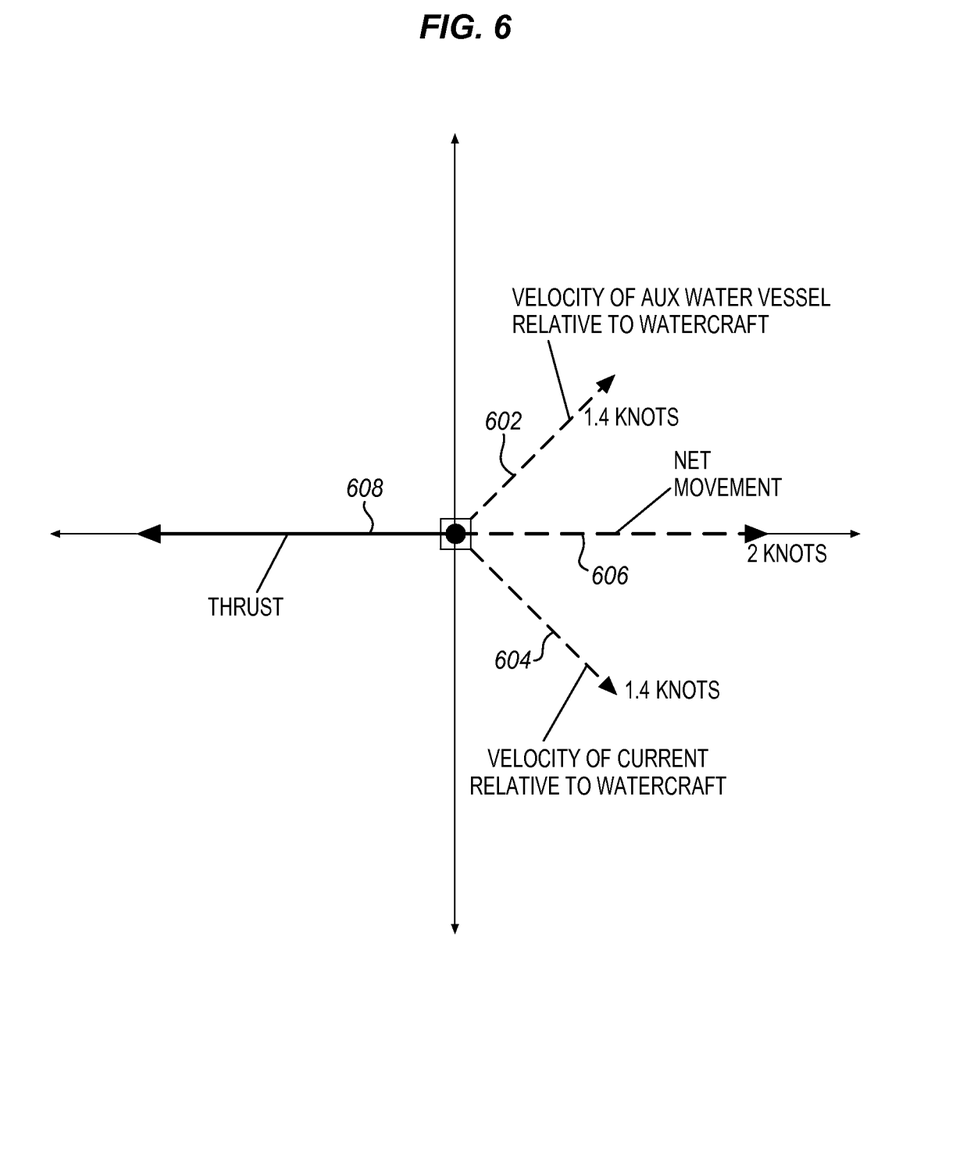
FIG. 6 is a diagram illustrating the velocity vectors measured by sensors in an exemplary embodiment.

FIG. 6 is a diagram illustrating the velocity vectors measured by sensors 204-205 in an exemplary embodiment. The velocity measurements of sensors 204-205 may be represented by velocity vectors indicating a direction and magnitude of velocity. Assume for this embodiment that the velocity measurement of sensor 204 (for auxiliary water vessel 104) is represented by velocity vector 602, with a magnitude of about 1.4 knots in the North-East direction. Because auxiliary water vessel 104 is considered a fixed reference point, the velocity of auxiliary water vessel 104 may be considered the estimated velocity of watercraft 102.

In actuality, auxiliary water vessel 104 may not be fixed and can drift due to the current in the water. To take into the account the movement of auxiliary water vessel 104, the velocity measurement of the current from sensor 205 may be used to indicate how much auxiliary water vessel 104 is moving. Assume for this embodiment that the velocity measurement of the current 501 from sensor 205 is represented by velocity vector 604, with a magnitude of about 1.4 knots in the South-East direction. Navigation controller 208 may add the velocity vector 604 of the current 501 and the velocity vector 602 of auxiliary water vessel 104 (which indicates the estimated velocity of watercraft 102) to determine the net movement of watercraft 102. In the example shown in FIG. 6, the net movement of watercraft may be represented by a velocity vector 606, with a magnitude of about 2 knots in the Easterly direction.

Navigation controller 208 may therefore determine a thrust vector 608 (thrust magnitude and direction) to hold watercraft 102 in a stationary position based on the net movement of watercraft 102 so that the resultant movement would be zero. The thrust vector would be of similar magnitude as the vector 606 representing the net movement of watercraft 102, but in the opposite direction. For instance, the thrust vector 608 in FIG. 6 is about 2 knots in the Westerly direction. Navigation controller 208 may then control propulsion system 210 based on the thrust vector 608 to maintain the stationary position of watercraft 102.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope is not limited to those specific embodiments. Rather, the scope is defined by the following claims and any equivalents thereof.

The invention claimed is:

1. An apparatus comprising:
a watercraft configured to operate in a body of water, the watercraft comprising:
a first sensor configured to measure a velocity of an auxiliary water vessel relative to the watercraft that is deployed at a depth between the watercraft and a ground surface of the body of water;
a second sensor configured to measure a velocity of current in the body of water relative to the watercraft; and
a navigation controller configured to process the velocity measurement of the auxiliary water vessel and the velocity measurement of the current to determine a net movement of the watercraft, and to control a propulsion system to compensate for the net movement of the watercraft to hold the watercraft in a stationary position.

2. The apparatus of claim 1 wherein the watercraft further includes:
a deployment controller configured to deploy the auxiliary water vessel from the watercraft into the body of water to submerge below the watercraft.

3. The apparatus of claim 2 wherein:
the deployment controller is configured to deploy the auxiliary water vessel to a depth that corresponds with a minimum range for the first sensor.

4. The apparatus of claim 1 wherein:
the navigation controller is configured to determine a thrust vector to hold the watercraft in the stationary position based on the velocity measurement of the auxiliary water vessel and the velocity measurement of the current, and to control the propulsion system based on the thrust vector.

5. The apparatus of claim 4 wherein:
the navigation controller is configured to add a velocity vector of the current with a velocity vector of the auxiliary water vessel to determine the net movement of the watercraft, and to determine the thrust vector based on the net movement.

6. The apparatus of claim 1 wherein:
the first sensor and second sensor perform the velocity measurements by measuring the Doppler effect artifacts of relative motion between the watercraft and the auxiliary water vessel.

7. The apparatus of claim 1 wherein:
the first sensor and the second sensor each comprise an Acoustic Doppler Current Profiler (ADCP).

8. The apparatus of claim 1 wherein:
the watercraft comprises a submersible craft.

9. The apparatus of claim 1 wherein:
the watercraft comprises one of a ship, a boat, and a floating craft.

10. The apparatus of claim 1 wherein:
the auxiliary water vessel comprises an Unmanned Underwater Vehicle (UUV).

11. The apparatus of claim 1 wherein:
the auxiliary water vessel is tethered to the watercraft.

12. A method for holding a watercraft stationary in a body of water, the method comprising:
measuring, with a first sensor, a velocity of an auxiliary water vessel relative to the watercraft that is deployed at a depth between the watercraft and a ground surface of the body of water;
measuring a velocity of current in the body of water relative to the watercraft with a second sensor;
processing the velocity measurement of the auxiliary water vessel and the velocity measurement of the current to determine a net movement of the watercraft; and
controlling a propulsion system to compensate for the net movement of the watercraft to hold the watercraft in a stationary position.

13. The method of claim 12 further comprising:
deploying the auxiliary water vessel from the watercraft into the body of water to submerge below the watercraft.

14. The method of claim 13 wherein deploying the auxiliary water vessel comprises:
deploying an Unmanned Underwater Vehicle (UUV) to a depth that corresponds with a minimum range for the first sensor.

15. The method of claim 12 wherein processing the velocity measurement of the auxiliary water vessel and the velocity measurement of the current comprises:
determining a thrust vector to hold the watercraft in the stationary position based on the velocity measurement of the auxiliary water vessel and the velocity measurement of the current; and
controlling the propulsion system based on the thrust vector.

16. The method of claim 15 further comprising:
adding a velocity vector of the current with a velocity vector of the auxiliary water vessel to determine the net movement of the watercraft; and
determining the thrust vector based on the net movement.

17. The method of claim 12 wherein:
measuring the velocity of the auxiliary water vessel comprises measuring the velocity of the auxiliary water vessel with a first Acoustic Doppler Current Profiler (ADCP); and
measuring the velocity of the current comprises measuring the velocity of the current with a second ADCP.

18. An apparatus comprising:
a positioning system comprising
sensors that measure a velocity of an auxiliary water vessel relative to a watercraft that is deployed at a depth between the watercraft and a ground surface of the body of water and that measure a velocity of current in the body of water relative to the watercraft; and a navigation controller configured to add a velocity vector representing the velocity measurement of the current with a velocity vector representing the velocity measurement of the auxiliary water vessel to determine a net movement of the watercraft, to determine a thrust vector to hold the watercraft in a stationary position based on the net movement of the watercraft, and to control a propulsion system on the watercraft based on the thrust vector.

19. The apparatus of claim 18 wherein:

the positioning system is configured to deploy the auxiliary water vessel in the body of water to submerge below the watercraft.

20. The apparatus of claim 18 wherein:

the positioning system is configured to measure the velocity of the auxiliary water vessel with a first Acoustic Doppler Current Profiler (ADCP), and to measure the velocity of the current with a second ADCP.

* * * * *